US010356817B2

(12) United States Patent
Derham et al.

(10) Patent No.: US 10,356,817 B2
(45) Date of Patent: Jul. 16, 2019

(54) LISTEN BEFORE TALK (LBT) IN WIRELESS COMMUNICATIONS

(71) Applicant: Avago Technologies General IP (Singapore) Pte. Ltd., Singapore (SG)

(72) Inventors: Thomas Edward Derham, La Jolla, CA (US); Ron Porat, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 52 days.

(21) Appl. No.: 15/478,640

(22) Filed: Apr. 4, 2017

(65) Prior Publication Data

US 2018/0020478 A1    Jan. 18, 2018

Related U.S. Application Data

(60) Provisional application No. 62/361,419, filed on Jul. 12, 2016, provisional application No. 62/477,152, filed on Mar. 27, 2017.

(51) Int. Cl.
*H04W 74/08* (2009.01)

(52) U.S. Cl.
CPC .............................. *H04W 74/0808* (2013.01)

(58) Field of Classification Search
CPC . H04W 16/14; H04W 72/04; H04W 72/0406; H04W 72/0446; H04W 72/085; H04W 74/0808; H04W 88/06
See application file for complete search history.

(56) References Cited

U.S. PATENT DOCUMENTS

| | | | |
|---|---|---|---|
| 7,680,150 B2* | 3/2010 | Liu | H04W 74/0816 |
| | | | 370/459 |
| 8,110,949 B2* | 2/2012 | Kim | H02J 5/005 |
| | | | 307/104 |

(Continued)

OTHER PUBLICATIONS

Networking Group, RFC 1940, Source Demand Routing: Packet Format and Forwarding Specification, May 1996.*

*Primary Examiner* — Ayaz R Sheikh
*Assistant Examiner* — Debebe A Asefa
(74) *Attorney, Agent, or Firm* — Garlick & Markison; Randy W. Lacasse

(57) ABSTRACT

A wireless communication device (alternatively, device, WDEV, etc.) includes at least one processing circuitry configured to support communications with other WDEV(s) and to generate and process signals for such communications. In some examples, the device includes a communication interface and a processing circuitry, among other possible circuitries, components, elements, etc. to support communications with other WDEV(s) and to generate and process signals for such communications. A WDEV monitors for ongoing transmission(s) on a wireless communication medium before transmitting a signal to another WDEV via the wireless communication medium. The WDEV uses different threshold levels (and/or variable threshold level functions) based on whether a detected ongoing transmission is associated with a first or second wireless communication network to determine when to make a concurrent transmission. For example, different WDEVs are associated with different wireless communication networks, and the WDEV uses different considerations to determine when to make transmissions in different situations.

20 Claims, 8 Drawing Sheets

(56) References Cited

U.S. PATENT DOCUMENTS

| | | | |
|---|---|---|---|
| 8,916,994 B2* | 12/2014 | Jung | ................. H01F 38/14 |
| | | | 307/104 |
| 2018/0054828 A1* | 2/2018 | Uchino | ............ H04W 28/16 |
| 2018/0270834 A1* | 9/2018 | Falconetti | ........ H04B 17/345 |

* cited by examiner

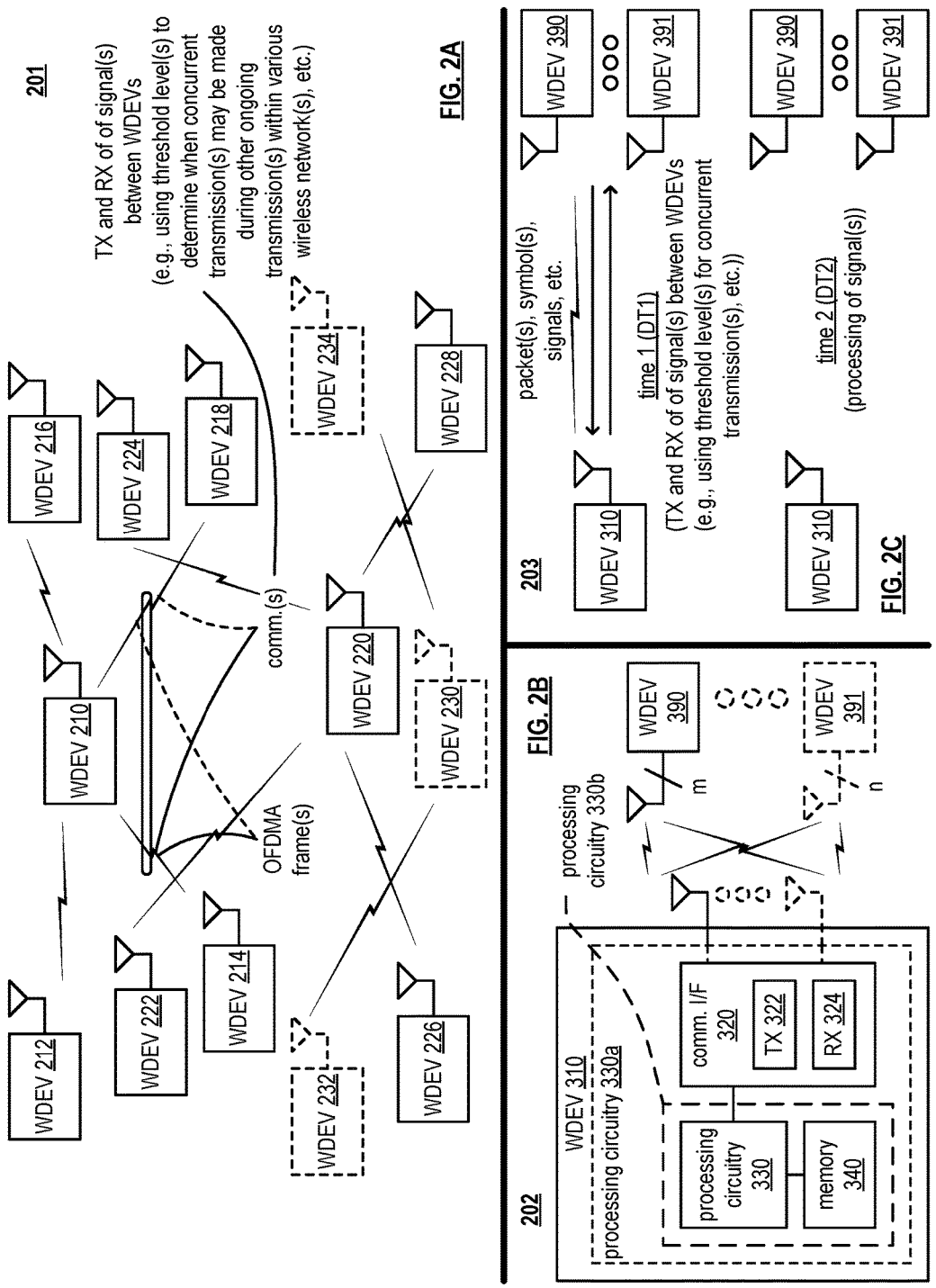

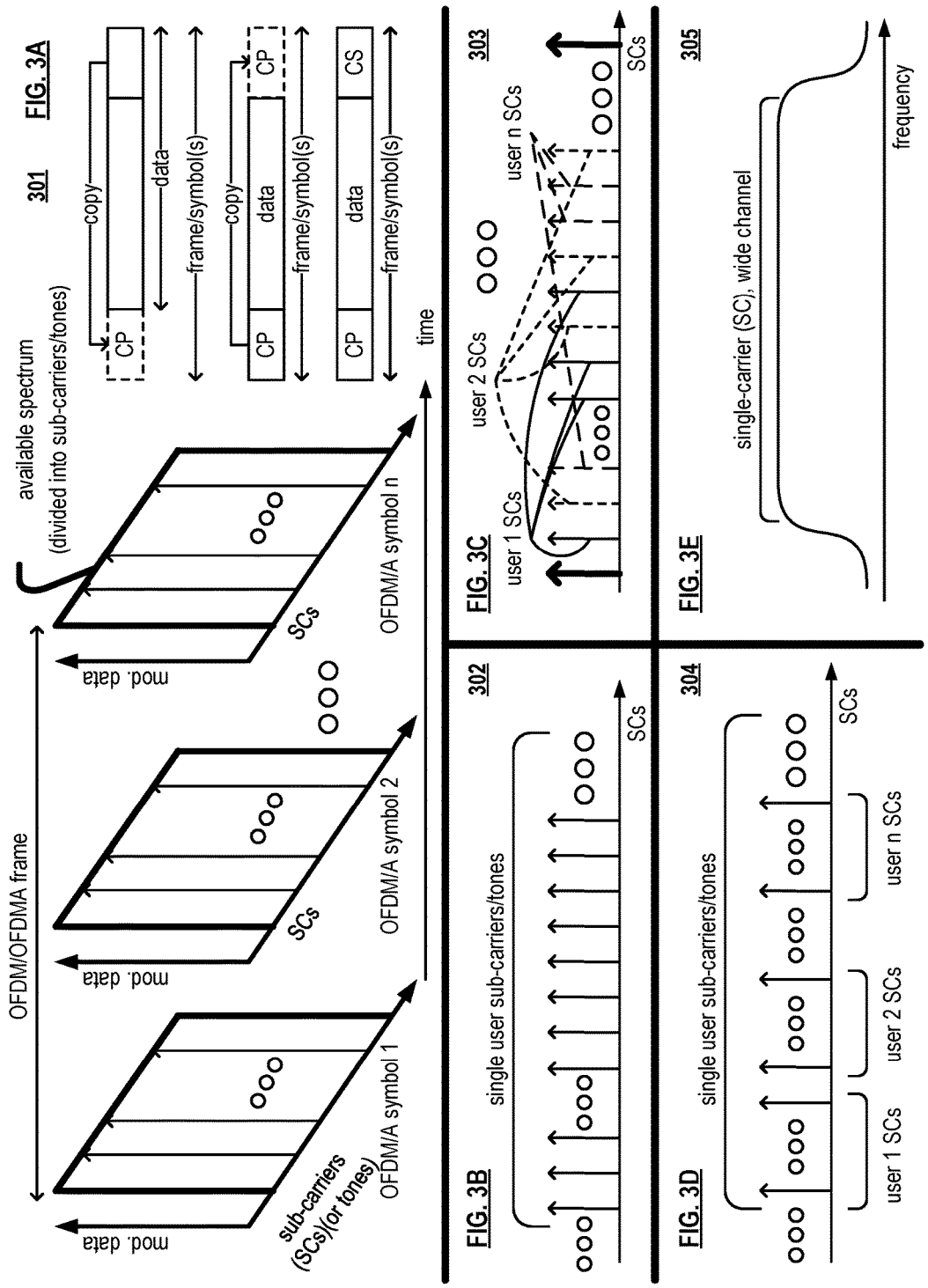

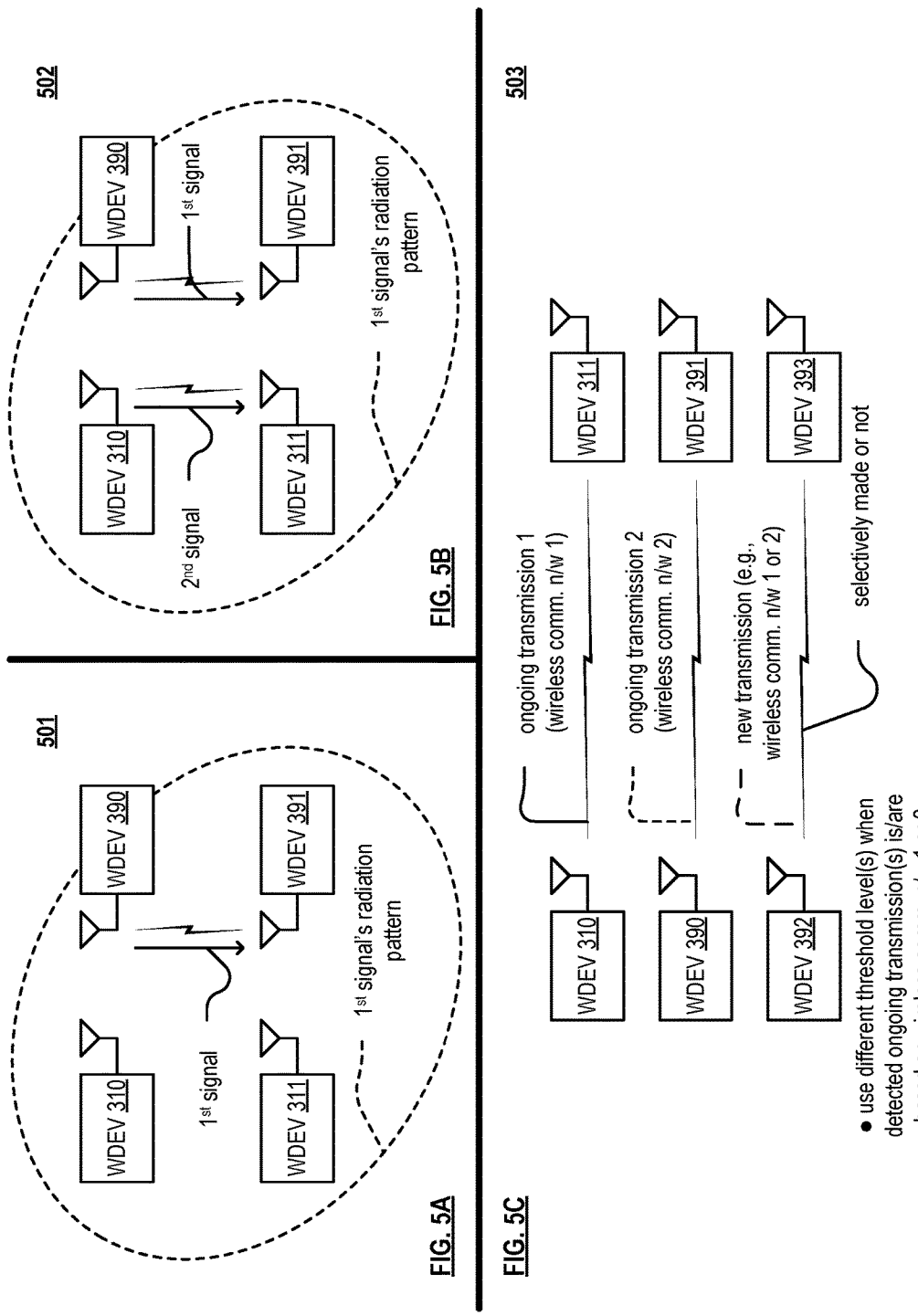

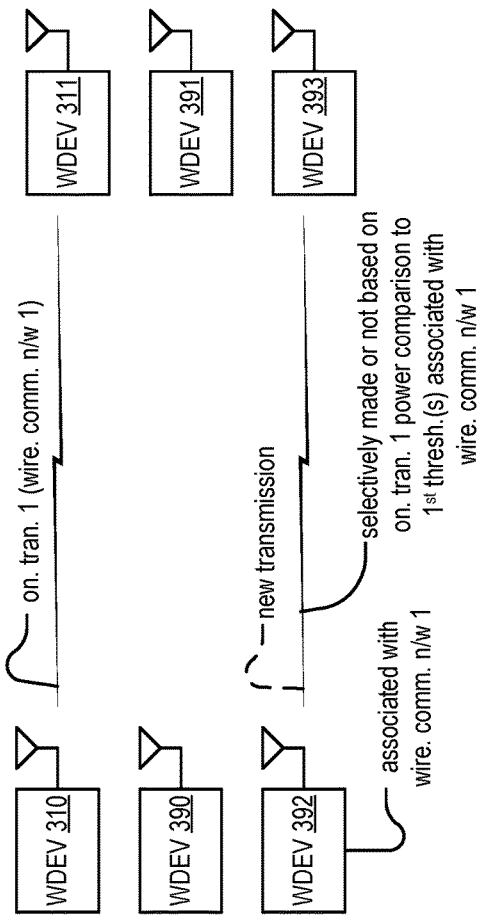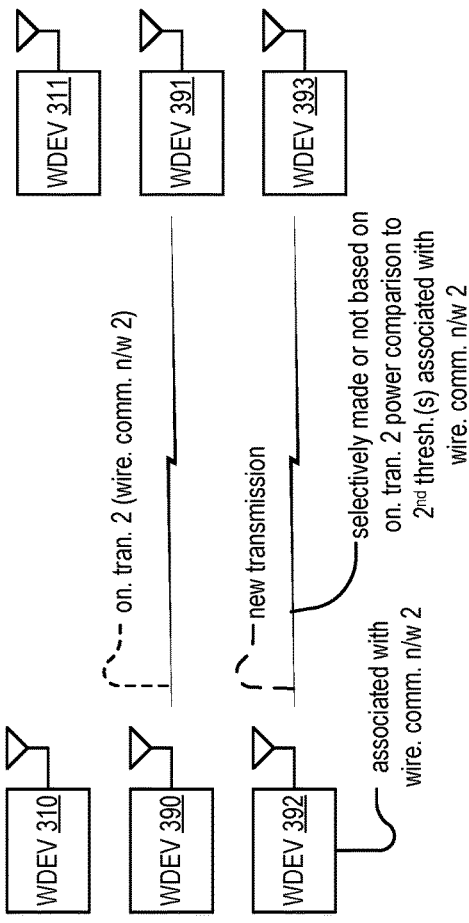

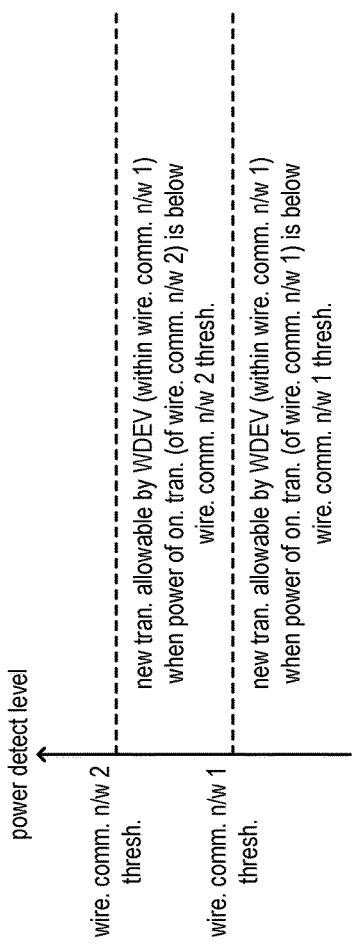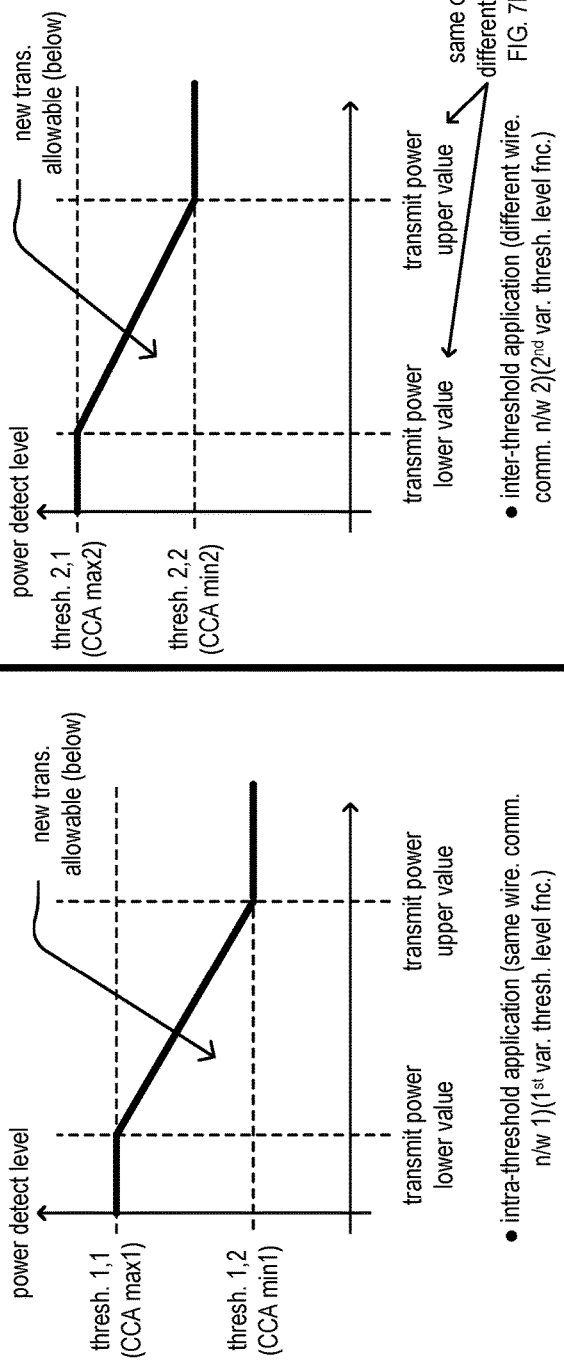

LISTEN BEFORE TALK (LBT) IN WIRELESS COMMUNICATIONS

CROSS REFERENCE TO RELATED PATENTS/PATENT APPLICATIONS

The present U.S. Utility Patent Application claims priority pursuant to 35 U.S.C. § 119(e) to U.S. Provisional Application No. 62/361,419, entitled "Listen before talk (LBT) in wireless communications," filed Jul. 12, 2016; and U.S. Provisional Application No. 62/477,152, entitled "Listen before talk (LBT) in wireless communications," filed Mar. 27, 2017, both of which are hereby incorporated herein by reference in their entirety and made part of the present U.S. Utility Patent Application for all purposes.

BACKGROUND

Technical Field

The present disclosure relates generally to communication systems; and, more particularly, to communications performed concurrently within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennas and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennas to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Some prior art wireless communication systems include multiple wireless communication devices (e.g., multiple wireless communication devices that may communicate with a given controller wireless communication device). Such prior art wireless communication systems operate such that only one wireless transmission is made at a time by a given wireless communication device in a prior art wireless communication system so as to minimize interference and collisions within a given proximate area, among other deleteriously effects. Such communications may be made from a given wireless communication device in a variety of ways including via a SISO transmission, via a MIMO transmission, etc. Appropriate coordination is made so that different respective wireless communication devices are provide access to the communication medium at different respective times within a given proximate area. This can lead to significant amounts of communication occupying the communication medium and also inefficient usage of the communication medium. There continues to be significant room for improvement in the manner by which wireless communication systems operate.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of different channel bandwidths and relationship there between.

FIG. 5A is a diagram illustrating another example of communication between wireless communication devices.

FIG. 5B is a diagram illustrating another example of communication between wireless communication devices.

FIG. 5C is a diagram illustrating another example of communication between wireless communication devices.

FIG. 6A is a diagram illustrating another example of communication between wireless communication devices.

FIG. 6B is a diagram illustrating another example of communication between wireless communication devices.

FIG. 7A is a diagram illustrating an example of multiple thresholds used to determine allowable communications between wireless communication devices.

FIG. 7B is a diagram illustrating an example of a variable threshold level function used to determine allowable communications between wireless communication devices.

FIG. 7C is a diagram illustrating another example of a variable threshold level function used to determine allowable communications between wireless communication devices.

DETAILED DESCRIPTION

Figure 1:
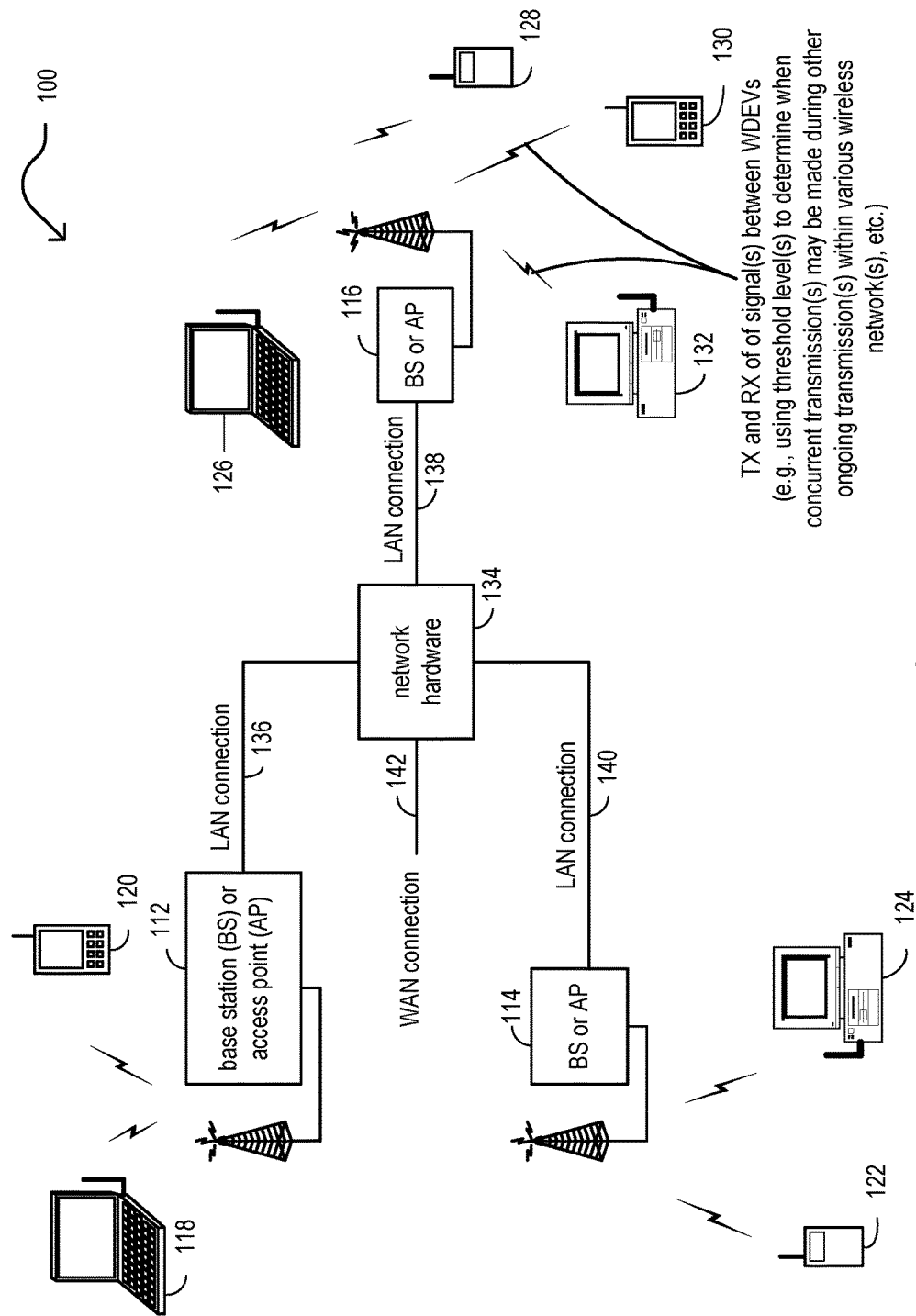
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes a processing circuitry to support communications with one or more of the other wireless communication devices (e.g., any other of the WDEVs 118-132 and BSs or APs 112-116). For example, such a processing circuitry is configured to perform both processing operations as well as communication interface related functionality. Such a processing circuitry may be implemented as a single integrated circuit, a system on a chip, etc.

In another example of implementation and operation, a wireless communication device (e.g., any one of the WDEVs 118-132 and BSs or APs 112-116) includes a processing circuitry and a communication interface configured to support communications with one or more of the other wireless communication devices (e.g., any other of the WDEVs 118-132 and BSs or APs 112-116).

In an example of operation and implementation, BS/AP 116 supports communications with WDEVs 130, 132, and BS/AP 114 supports communications with WDEVs 122, 124. For example, the WDEV 130 is configured to monitor for an ongoing transmission on a wireless communication medium before transmitting a signal to another wireless communication device (e.g., BS/AP 116) via the wireless communication medium (e.g., such as an ongoing transmission between BS/AP 114 and WDEV 124). When the ongoing transmission is detected on the wireless communication medium by the WDEV 130, the WDEV 130 is configured to process the ongoing transmission to determine whether the ongoing transmission is based on a first wireless communication network that includes the wireless communication device (e.g., a wireless communication network that includes BS/AP 116 and WDEV 130) or based on a second wireless communication network that excludes the wireless communication device (e.g., a wireless communication network that includes BS/AP 114 and WDEV 124).

When the WDEV 130 determines that the ongoing transmission is based on the first wireless communication network, such as that includes BS/AP 116 and WDEV 130, the WDEV 130 is configured to transmit the signal to the other wireless communication device (e.g., BS/AP 116) via the wireless communication medium when power of the ongoing transmission compares favorably to a first threshold level associated with the first wireless communication network. Alternatively, When the WDEV 130 determines that the ongoing transmission is based on the second wireless communication network, such as that includes BS/AP 114 and WDEV 124, the WDEV 130 is configured to transmit the signal to the other wireless communication device (e.g., BS/AP 116) via the wireless communication medium when the power of the ongoing transmission compares favorably to a second threshold level associated with the second wireless communication network.

In some examples, the first wireless communication network may be viewed as a wireless communication network to which the WDEV 130 is associated and/or belongs, and the second wireless communication network may be viewed as another wireless communication network to which the WDEV 130 is not associated and/or does not belong. For example, communications associated with the first wireless communication network may be viewed as intra-spatial reuse group (SRG) communications and communications associated with the second wireless communication network may be viewed as inter-SRG communications such as from the perspective of the WDEV 130. Also, in some examples, note that a SRG generally refers to a communication system (and/or portion thereof) that includes a group of basic services sets (BSSs) such as may be serviced by a group or set of access points (APs) that service one or more wireless stations (STAs).

Generally speaking, a wireless communication device (e.g., WDEV 130) is configured to employ different respective threshold levels (and/or variable threshold level functions) based on whether a detected ongoing transmission is associated with a first or second wireless communication network to determine when to make a concurrent transmission.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of operation and implementation, WDEV 210 supports communications with WDEVs 212, 214, 216, and 218, and WDEV 220 supports communications with WDEVs 222, 226, 224, and 228.

For example, the WDEV 218 is configured to monitor for an ongoing transmission on a wireless communication medium before transmitting a signal to another wireless communication device (e.g., WDEV 210) via the wireless communication medium (e.g., such as an ongoing transmission between WDEV 220 and WDEV 224). When the ongoing transmission is detected on the wireless communication medium by the WDEV 218, the WDEV 218 is configured to process the ongoing transmission to determine whether the ongoing transmission is based on a first wireless communication network that includes the wireless communication device (e.g., a wireless communication network that includes WDEV 210 and WDEVs 218) or based on a second wireless communication network that excludes the wireless communication device (e.g., a wireless communication network that includes WDEV 220 and WDEV 224).

When the WDEV 218 determines that the ongoing transmission is based on the first wireless communication network, such as that includes WDEV 210 and WDEVs 218, the WDEV 218 is configured to transmit the signal to the other wireless communication device (e.g., WDEV 210) via the wireless communication medium when power of the ongoing transmission compares favorably to a first threshold level associated with the first wireless communication network. Alternatively, When the WDEV 218 determines that the ongoing transmission (and/or first variable threshold level function) is based on the second wireless communication network, such as that includes WDEV 220 and WDEV 224, the WDEV 218 is configured to transmit the signal to the other wireless communication device (e.g., WDEV 210) via the wireless communication medium when the power of the ongoing transmission compares favorably to a second threshold level (and/or second variable threshold level function) associated with the second wireless communication network.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennas, and WDEV 391 may include n antennas).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330*a* may be implemented to include the processing circuitry 330, the communication interface 320 (including the TX 322 and/or RX 324 thereof), and the memory 340. Considering another example, one processing circuitry 330*b* may be implemented to include the processing circuitry 330 and the memory 340 yet the communication interface 320 is a separate circuitry.

Considering even another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330*a* configured to perform various operations. In even other examples, the device 310 includes processing circuitry 330*b* configured to perform various operations. Generally, such operations include generating, transmitting, etc. signals intended for one or more other devices (e.g., device 390 through 391) and receiving, processing, etc. other signals received for one or more other devices (e.g., device 390 through 391).

In some examples, note that the communication interface 320, which is coupled to the processing circuitry 330, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the device 310 may be communicated via any of these types of communication systems.

FIG. 2C is a diagram illustrating another example 203 of communication between wireless communication devices. At or during a first time (e.g., time 1 ($\Delta T1$)), the WDEV 310 transmits signal(s) to WDEV 390, and/or the WDEV 390 transmits other signal(s) to WDEV 310. At or during a second time (e.g., time 2 ($\Delta T2$)), the WDEV 310 processes signal(s) received from WDEV 390, and/or the WDEV 390 processes signal(s) received from WDEV 310.

In an example of operation and implementation, WDEV 310 is configured to monitor for an ongoing transmission on a wireless communication medium before transmitting a signal to another wireless communication device (e.g., to WDEV 390 and/or WDEV 391) via the wireless communication medium. When the ongoing transmission is detected on the wireless communication medium, the WDEV 310 is configured to process the ongoing transmission to determine whether the ongoing transmission is based on a first wireless communication network that includes the wireless communication device (e.g., that includes WDEV 310 and WDEVs 390-391) or based on a second wireless communication network that excludes the wireless communication device (e.g., that excludes WDEV 310 and WDEVs 390-391).

When the ongoing transmission is based on the first wireless communication network, the WDEV 310 is configured to transmit the signal to the other wireless communication device (e.g., to WDEV 390 and/or WDEV 391) via the wireless communication medium when power of the ongoing transmission compares favorably to a first threshold level associated with the first wireless communication network.

Alternatively, when the ongoing transmission is based on the second wireless communication network, the WDEV 310 is configured to transmit the signal to the another wireless communication device (e.g., to WDEV 390 and/or WDEV 391) via the wireless communication medium when the power of the ongoing transmission compares favorably to a second threshold level associated with the second wireless communication network.

In some examples, when the ongoing transmission is based on the first wireless communication network, the WDEV 310 is configured to re-monitor for at least one of the ongoing transmission or another ongoing transmission on the wireless communication medium when the power of the ongoing transmission compares unfavorably to the first threshold level associated with the first wireless communication network (e.g., that includes WDEV 310 and WDEVs 390-391). When the ongoing transmission is based on the second wireless communication network, the WDEV 310 is configured to re-monitor for the at least one of the ongoing transmission or the another ongoing transmission on the wireless communication medium when the power of the ongoing transmission compares unfavorably to the second threshold level associated with the second wireless communication network (e.g., that excludes WDEV 310 and WDEVs 390-391).

In even other examples, the WDEV 310 is configured to process the ongoing transmission in accordance with a first clear channel assessment (CCA) procedure that employs the first threshold level when the ongoing transmission is based on the first wireless communication network (e.g., that includes WDEV 310 and WDEVs 390-391). Also, the WDEV 310 is configured to process the ongoing transmission in accordance with a second CCA procedure that employs the second threshold level when the ongoing transmission is based on the second wireless communication network (e.g., that excludes WDEV 310 and WDEVs 390-391).

In yet other examples, the WDEV 310 is configured to receive, from a controller wireless communication device of at least one of the first wireless communication network or the second wireless communication network, certain information that specifies certain information. For example, such a controller wireless communication device may be configured to within the overall wireless communication system to inform various other wireless communication devices (e.g., access points (APs), and/or wireless stations (STAs)) in an overall wireless communication system of the existence of those other wireless communication devices (e.g., access points (APs), and/or wireless stations (STAs)) and the respective basic services sets (BSSs) with which they are associated. Note that various BSSs may operate within a vicinity such that there may be one or more overlapping basic services sets (OBSSs). In some examples, the first wireless communication network includes the WDEV 310 and also includes a first set of jointly managed basic services sets (BSSs) supported by a first plurality of access points (APs) that service a first at least one wireless station (STA). The second wireless communication network that excludes the WDEV 310 includes a second set of jointly managed BSSs supported by a second plurality of APs that service a second at least one STA. Also, the first wireless communication network and the second wireless communication network include at least some overlapping coverage (e.g., are at least partially OBSSs).

Generally speaking, an extended service set (ESS) may be viewed as including wireless communication devices within a same or common network. However, an ESS may more generally be understood to include a set of BSSs that are jointly managed (e.g., such as by a controller wireless communication device, which may be an AP, a STA, and/or any other wireless communication device, wireless communication device and/or communication device such as may be connected to one or more APs via a wired and/or wireless backbone, network, etc.). Alternatively, such a set of BSSs that are jointly managed may be referred to as a spatial reuse group (SRG). Such an ESS and/or SRG may be characterized as including a number of APs and the BSSs they support. Note that such devices within an ESS and/or SRG need not specifically have the exact same Service Set Identifier (SSID), but they are nonetheless are associated with one another and part of a jointly managed wireless network. With respect to an ESS, note that while ESS may be used to mean the same wireless network in some examples, note that the various aspects, embodiments, and/or examples of the invention as described herein are not necessarily limited only to the same ESS (e.g., such as may be used in accordance with various standard, communication protocols, and/or recommended practices such as per an IEEE 802.11 definition). More generally in accordance with various aspects, embodiments, and/or examples of the invention, an ESS may be viewed as being a set of BSS that are jointly managed. For example, an operator of the ESS can choose a power detect (PD) threshold with knowledge of the spatial reuse gain vs interference tradeoff it will cause within the overall wireless communication system and/or different respective wireless communication networks within the overall wireless communication system.

In some examples, a wireless communication system is implemented to include more than one set of BSSs. For example, a first set of basic services sets (BSSs) is supported by a first plurality of wireless communication devices that correspond to the first wireless communication network that includes the WDEV 310, and a second set of BSSs is supported by a second plurality of other wireless communication devices that correspond to the second wireless communication network that excludes the WDEV 310.

In such situations, the WDEV 310 is configured to process the ongoing transmission to determine a source wireless communication device and/or a destination wireless communication device of the ongoing transmission (e.g., either a transmitter and/or receiver of the ongoing transmission). Such determination may be made various ways including determining a media access controller (MAC) address associated with the ongoing transmission, a receiver address (RA), a transmitter address (TA), and/or any other characteristic(s) of the ongoing transmission.

The WDEV 310 is configured to determine that the ongoing transmission is based on the first wireless communication network that includes the wireless communication device when the source wireless communication device and/or the destination wireless communication device is included in the first set of BSSs. The WDEV 310 is configured to determine that the ongoing transmission is based on the second wireless communication network that excludes the wireless communication device when the source wireless communication device and/or the destination wireless communication device is included in the second set of BSSs.

In even other examples, when the ongoing transmission is based on the first wireless communication network, the WDEV 310 is configured to select the first threshold level associated with the first wireless communication network based on a first variable threshold level function that is based on a first transmit power to be used by the wireless communication device to transmit the signal. Also, when the ongoing transmission is based on the second wireless communication network, the WDEV 310 is configured to select the second threshold level associated with the second wireless communication network based on a second variable threshold level function that is based on a second transmit power to be used by the wireless communication device to transmit the signal. For example, such determination of when it is allowable to perform an ongoing transmission may be made using one or more variable threshold level function(s) as opposed to and/or in addition to one or more threshold level(s).

In some examples, the WDEV 310 includes a communication interface that is configured to support communications within a satellite communication system, a wireless communication system, a wired communication system, a fiber-optic communication system, and/or a mobile communication system. Also, the WDEV 310 includes processing circuitry that is configured to detect the ongoing transmission based on at least one signal received via the communication interface. Also, the processing circuitry is configured to transmit the signal to another wireless communication device (e.g., WDEV 390 and/or 391) via the communication interface and via the wireless communication medium.

Note that the WDEV 310 includes a wireless station (STA) in some examples, and the other WDEV 390 and/or WDEV 391 includes an access point (AP) that supports a basic services set (BSS) within the first wireless communication network that includes the WDEV 310. In other examples, note that the WDEV 310 includes an AP, and the WDEV 390 includes a STA such that the WDEV 310 supports a basic services set (BSS) within the first wireless communication network.

In another example of implementation and operation, the WDEV 310 includes both a processing circuitry to perform many of the operations described above and also includes a communication interface, coupled to the processing circuitry, that are configured in combination to support communications within a satellite communication system, a wireless communication system, a wired communication system, a fiber-optic communication system, and/or a mobile communication system. For example, certain operations may be performed by only the processing circuitry, other certain operations may be performed by only the communication interface, and even some other certain operations may be performed by both the processing circuitry and the communication interface.

In some examples, the communication interface is configured to transmit one or more signals to WDEV 390 and/or WDEV 391. Also, the communication interface is configured to receive one or more other signals from WDEVs 390-391. In some other examples, the processing circuitry is configured to transmit the one or more signals to WDEV 390 and/or WDEV 391 via the communication interface. Also, the processing circuitry is configured to receive the one or more other signals from WDEVs 390-391 via the communication interface. In even other examples, both the communication interface and the communication interface operate cooperatively and are configured to generate, process, transmit, etc. the one or more signals to WDEV 390 and/or WDEV 391. Also, the communication interface and the communication interface operate cooperatively and are configured to receive, process, etc. the one or more other signals from WDEVs 390-391.

In certain embodiments and examples, when an ongoing transmission is detected as being made between wireless communication devices of the same BSS as the WDEV 310, the WDEV 310 will never make a concurrent transmission. In some examples, it may never be appropriate to make a new transmission during an ongoing transmission within the same BSS as the WDEV 310 (e.g., never make or start a new transmission during an ongoing transmission by a wireless communication device within the same basic services set (BSS), such as being an intra-BSS ongoing transmission).

However, in other certain embodiments and examples and in certain situations, when an ongoing transmission is detected as being made between wireless communication devices of the same BSS as the WDEV 310 (and/or of the same spatial reuse group (SRG) as the WDEV 310), the WDEV 310 can in fact make a concurrent transmission such as when the power of the ongoing transmission compares favorably to a threshold level (and/or variable threshold level function) associated with that BSS and/or an extended service set (ESS) and/or spatial reuse group (SRG). Also, in even other certain embodiments and examples and in certain situations, when an ongoing transmission is detected as being made between wireless communication devices within a different BSS as the WDEV 310, the WDEV 310 can in fact make a concurrent transmission such as when the power of the ongoing transmission compares favorably to another threshold level (and/or another variable threshold level function) associated with that BSS and/or an extended service set (ESS) and/or spatial reuse group (SRG).

Note the distinction here between concurrent transmissions that may unfortunately interfere with one another and possible simultaneous transmissions that are intentional and coordinated, such as with respect to a multiple-user multiple-input-multiple-output (MU-MIMO) transmission and/or orthogonal frequency division multiple access (OFDMA) transmission where two or more wireless communication devices are intentionally make concurrent transmissions in a coordinated manner so as not to interfere with one another. Such MU-MIMO and/or OFDMA transmissions may include different respective transmissions from more than one wireless communication device and are intentional and thereby coordinated so that they do not interfere with other components of that MU-MIMO and/or OFDMA transmission.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband subcarriers (e.g., relatively lower data rate carriers). The subcarriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems.

In addition, as shown in right hand side of FIG. 3A, a cyclic prefix (CP) and/or cyclic suffix (CS) (e.g., shown in right hand side of FIG. 3A, which may be a copy of the CP) may also be employed within the guard interval to allow switching time (e.g., such as when jumping to a new communication channel or sub-channel) and to help maintain orthogonality of the OFDM and/or OFDMA symbols. In some examples, a certain amount of information (e.g., data bits) at the end portion of the data portion is/are copied and placed at the beginning of the data to form the frame/symbol(s). In a specific example, consider that the data includes data bits $x_0, x_1, \ldots x_{N-N_{cp}}, \ldots, x_{N-1}$, where the $x_{N-N_{cp}}$ bit is the first bit of the end portion of the data portion that is to be copied, then the bits $x_{N-N_{cp}}, \ldots, x_{N-1}$, are copied and placed at the beginning of the frame/symbol(s). Note that such end portion of the data portion that is/are copied and placed at the beginning of the data to form the frame/symbol(s) may also be shifted, cyclically shifted, and/or copied more than once, etc. if desired in certain embodiments. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such as processing circuitry 330a and/or processing circuitry 330b shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

Figure 4C:
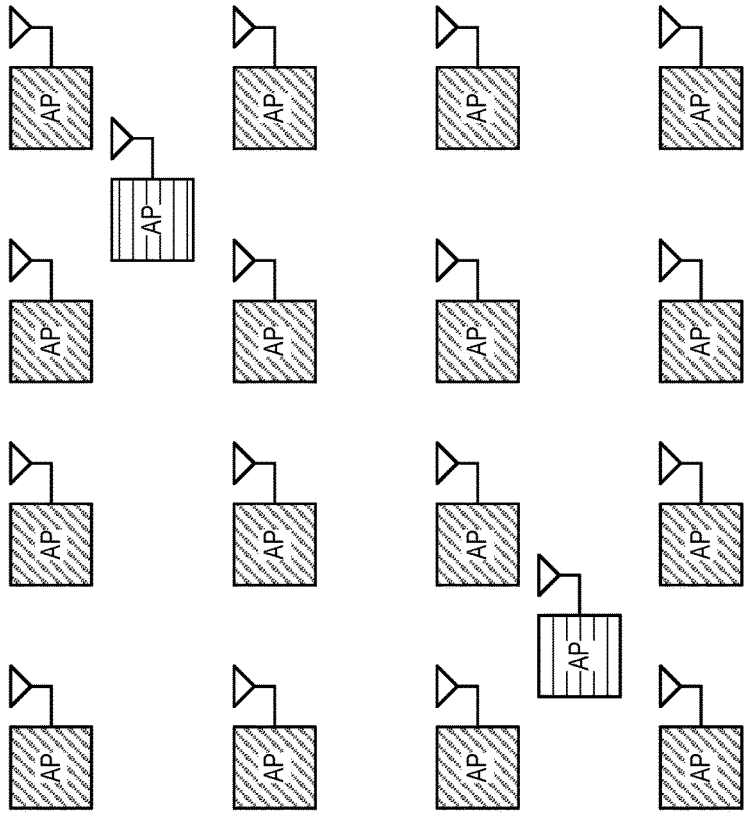
FIG. 4C is a diagram illustrating an example of two WLANs respectively including APs of different densities operating on the same channel (e.g., first APs (e.g., APs or AP-operative STAs of a first WLAN having a first density) and second APs (e.g., APs or AP-operative STAs of a second WLAN having a second density (both supporting communications on the same channel).
Figure 4A:

FIG. 4A is a diagram illustrating an example of different channel bandwidths and relationship there between. In one example, a device (e.g., the device 310, alternatively referred to as WDEV 310, wireless communication device 301, etc.) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc. Generally speaking, any such wireless communication device as described herein may operate using any communication channel, communication channel sub-band, etc. such as described with respect to FIG. 4A and/or any communication thereof.

Certain examples of wireless communication systems described herein can operate using listen before talk (LBT) mechanisms to arbitrate access to a shared communication medium in a distributed manner (e.g., a wireless local area network (WLAN) that operates without centralized scheduling). For example, each time an IEEE 802.11 (e.g., WiFi) capable device intends to transmit data to another device, it first performs LBT to check there are no other devices already transmitting with which it would interfere.

An LBT mechanism involves a device that is intending to transmit first listening to the communication medium for a certain period of time, and making a measurement to determine if the current signal level on the communication medium is above or below a threshold. If the signal level is below the threshold, the device deems the communication medium as "idle" and proceeds to transmit. Otherwise, the device deems the communication medium as "busy" and generally defers for some period of time before performing LBT again.

Figure 4B:
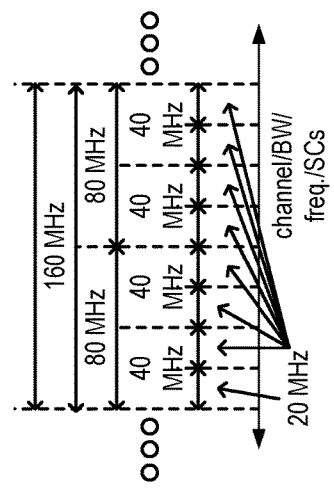
FIG. 4B is a diagram illustrating an example of two wireless local area networks (WLANs) operating on the same channel (e.g., two access points (APs) (e.g., APs or AP-operative wireless stations (STAs)) supporting communications on the same channel).

FIG. 4B is a diagram illustrating an example 402 of two wireless local area networks (WLANs) operating on the same channel (e.g., two access points (APs) (e.g., APs or AP-operative wireless stations (STAs)) supporting communications on the same channel).

This diagram shows an example of two Wi-Fi networks, each comprising one Access Point (AP) and one client device or Station (STA), which are operating on the same wireless channel. In one example, AP1 is currently transmitting data to STA1, and AP2 starts to perform LBT to determine whether or not it can transmit to STA2, simultaneously with AP1's transmission.

In current network technologies that implement LBT, the threshold level used to determine if the communication medium is busy or idle is generally set to a constant value. It is common for an upper bound on the LBT threshold to be set in the technical specifications of wireless standards. This upper bound is chosen conservatively in order to avoid so-called "collisions". For example, if AP2 begins to transmit (to STA2) while AP1 is already transmitting (to STA1), the signal from AP2 may cause significant interference at STA1 such that STA1 can no longer decode the wanted signal from AP1. Likewise, STA2 may be unable to decode the signal from AP2 since the ongoing transmissions from AP1 cause too much interference. By settings the LBT threshold at a conservative value (e.g., acceptably not too high or not too low), AP2 declares the communication medium as "busy" (and so is not allowed to transmit) unless the signal it hears from AP1 is weak, which provides a reasonable (albeit imperfect) indication that the interference AP2 would cause to STA1 would not be large enough to cause a collision.

However, a conservatively set LBT threshold can be sub-optimal in some cases, because it prevents devices from simultaneously transmitting (and hence increasing the total or aggregate throughput) even in some circumstances where the interference they would cause would be small enough to have little or no effect (e.g. not cause a collision).

The actual impact that such interference has (e.g. the chance of a collision occurring if the two APs transmit simultaneously) can be determined analytically by examining the signal to Interference and Noise Ratio (SINR) value at the respective receivers. The SINR is given by the ratio of the wanted signal power to the sum of the interference and (thermal) noise powers. For example, if AP1 and AP2 in FIG. 4B are simultaneously transmitting, the SINR at STA1 is given by the ratio of the wanted signal power it receives from AP1 to the sum of the interference it receives from AP2 plus STA2's own receiver noise power. If only AP1 is transmitting (e.g., AP2 is silent), then clearly the interference from AP2 is zero. Therefore, the impact of interference from simultaneous transmissions is always to reduce the SINR (so-called "SINR Compression"). In this example, the SINR at STA1 is decreased if AP2 is simultaneously transmitting. If the interference is sufficiently large to reduce the SINR at STA1 below the so-called Minimum Sensitivity at which STA1 can decode the data, a collision is likely to occur. On the other hand, if the interference is small enough that the SINR at STA1 is maintained above the Minimum Sensitivity, it is likely that STA1 can still successfully receiver and decode the data. The same logic applies to the impact of interference from AP1 according to the SINR at STA2.

Certain examples of wireless communication systems described herein can operate using wireless technologies such as IEEE 802.11 to support a feature known as "Rate Adaptation". If the SINR at a receiver persistently degrades to the point where interference from other transmissions is causing collisions to occur, the transmitter can adapt the Modulation & Coding rate (MCS) at which it transmits the data. This has the effect of increasing the Minimum Sensitivity at the receiver (e.g., the receiver can still decode the data even at a lower SINR), however (in accordance with Shannon's Law) this has the consequence of reducing the data rate (throughput) of the link. In addition, if the SINR degrades below the Minimum Sensitivity of the lowest MCS supported by the devices, then Rate Adaptation cannot adapt the MCS any further and so the link completely fails. This situation may occur in links where the wanted signal power is fairly weak, since (according to the SINR definition) even relatively small levels of interference may be sufficient to reduce the SINR below the Minimum Sensitivity of the lowest supported MCS.

Note that the value of the LBT threshold represents a trade-off between so-called "spatial reuse" (allowing multiple devices to transmit simultaneously, in order to maximize the "aggregate" or sum data throughput achieved) and "link protection" (preventing the data throughput on a given link from degrading or even complete link failure). From certain perspectives, an ideal solution would be for the transmitting device to dynamically modify the LBT threshold it uses based on full knowledge of the impact it would cause to the SINR of other links were it to transmit simultaneously, according to some optimization criteria (e.g. proportional fairness criterion between aggregate throughput/capacity and per-link fairness). However, the signaling overhead and complexity required for all potentially transmitting devices to obtain such full information in real-time is prohibitive. Reduced complexity solutions may operate based on limited feedback such as a tolerable interference margin embedded in signaling frames, however the signaling frames containing this information may not always be transmitted in a sufficiently timely fashion (e.g. for spatial reuse with downlink transmissions without prior RTS/CTS exchange), and the information is not available at all from existing/legacy devices. The present disclosure present a more elegant and simpler solution to address such cases.

Another approach may operate to allow a device to raise the LBT threshold it uses to evaluate a potential transmission if it commensurately reduces the transmit power of that transmission. This approach does allow to increase spatial reuse in scenarios where lower transmit power can be used. However, because the transmitter has no knowledge of the impact of the interference it would cause, it is often not acceptable to aggressively raise the LBT threshold in this approach. Specifically, while a high LBT threshold may be beneficial in some cases by enabling spatial reuse without significant impact on SINR (e.g. in the example, where AP2 is relatively close to AP1 but far away from STA1), it would cause substantial degradation due to severe SINR compression in other cases (e.g. where AP2 is relatively close to STA1 but far away from AP1). Therefore, an alternative approach would provide significant improvement while taking into account some basic knowledge of the likely impact on SINR without requiring complex real-time feedback.

Various aspects of the invention address such concerns, and others, by taking into account the relationship of SINR distribution in a network with the physical network topology.

FIG. 4C is a diagram illustrating an example 403 of two WLANs respectively including APs of different densities operating on the same channel (e.g., first APs (e.g., APs or AP-operative STAs of a first WLAN having a first density and second APs (e.g., APs or AP-operative STAs of a second WLAN having a second density both supporting communications on the same channel).

This diagram shows an example of two networks (two extended service sets (ESSs)) deployed in the same location—similar to FIG. 4B except this time each network (ESS) comprises multiple APs for extended coverage area. For simplicity, the STAs are not shown in this diagram, but for the sake of illustration it can be considered there are multiple STAs connected to the APs of each network, randomly positioned over the coverage area. Each AP, plus the STAs connected to it, are collectively known as a basic services set (BSS). Depending on many factors (including but not limited to business model, customer base, availability of siting/backhaul/power, etc.), different networks may be deployed with very different Access Point densities (e.g. the number of APs deployed per square meter of terrain). In FIG. 4C, network 1 has high AP density, while network 2 has lower AP density (e.g., network 1 includes more APs per unit area than network 2).

In the case of network 1, since the distance between a STA and its nearest AP is not so large, all wanted signal powers are typically quite high. As described above, such links can tolerate relatively high levels of interference without significant SINR compression, and therefore the LBT threshold for simultaneous transmission of links within this network can be higher.

In contrast, in the case of network 2, the distance between a STA and its nearest AP are distributed over a broader range, and so some of the signal powers are quite low. The links with low signal power can only tolerate low levels of interference before significant SINR compression occurs, and therefore the LBT threshold for simultaneous transmission of links within this network should be lower. The impact of imposing high interference into such networks would be to reduce the effective coverage of each AP.

Note that this discussion on raising the LBT threshold only applies to a device considering to transmit simultaneously with a device in another BSS (e.g., such as an overlapping basic services set (OBSS)—e.g., another AP, or a STA associated with another AP). A device should normally not try to transmit simultaneously with another transmission in its own BSS (e.g., except for special uplink transmissions such as OFDMA or MU-MIMO where the devices use mutually orthogonal spatial and/or frequency resources) since it is not possible for both transmissions to be successfully received—either two STAs are trying to transmit to the same AP, or an AP and STA are trying to transmit together over the same half-duplex channel.

Since it is assumed a transmitting device does not possess full information on the SINR impact it would cause on a per-link basis, it is not possible to dynamically adapt the LBT threshold on that basis in real-time. However, since all the links in network 1 can withstand higher interference, it is desirable that the operator of network 1 should be able to configure the devices in its network to use a higher LBT threshold when transmitting simultaneously with other devices in the same network. Similarly, since some of the links in network 2 are more susceptible to interference, the operator of network 2 should configure the devices in its network to use a lower LBT threshold when transmitting simultaneously with other devices in the same network.

Further, since both networks are sharing the same spectrum and therefore should basically afford each other fair and equal use of the unlicensed spectrum, it is not desirable or acceptable for devices in network 1 to use a higher LBT threshold when transmitting simultaneously with devices in network 2, since (as described above) some of those links are susceptible to interference and hence network 1 could unfairly impact network 2.

Various aspects of the invention solve this issue by allowing two (or more) separate LBT thresholds to be set. For example, a first LBT threshold (called intra-ESS threshold and/or intra-SRG threshold) is defined for use when a device is considering to transmit simultaneously with another device in the same network (ESS). This threshold may be set by the operator of that network, since its impact (in terms of interference) is limited to other links within that same network. An operator may set this threshold to maximize spatial reuse according to the deployed density of their APs or other RF planning considerations. In some examples, note that the intra-ESS threshold (and/or intra-SRG threshold) may be alternatively referred to as SRG OBSS PD MIN/MAX. As described above, a set of BSSs that are jointly managed may be referred to as a spatial reuse group (SRG). Also, such an extended service set (ESS) and/or SRG may be characterized as including a number of APs and the BSSs they support. Note that while such wireless communication devices within an ESS may be associated with a given Service Set Identifier (SSID) and such an SSID can identify an ESS, a spatial reuse group (SRG) may comprise or include basic services sets (BSSs) associated with different respective SSIDs and/or ESSs. For example, wireless communication devices within a SRG or a set of BSSs may include wireless communication devices that are nonetheless associated with one another and part of a jointly managed wireless network.

A second LBT threshold (e.g., such as called inter-ESS threshold and/or inter-SRG threshold) is defined for use when a device is considering to transmit simultaneously with another device in a different network (different extended services set (ESS)). This threshold may be set globally (e.g. by a standards organization), since its impact extends to fairness and coexistence between different networks, and therefore would typically be set to a relatively conservative value (e.g., lower than the intra-ESS threshold and/or an intra-SRG threshold). In some examples, note that the inter-ESS threshold (and/or intra-ESS threshold) may be alternatively referred to as NON SRTG OBSS PD MIN/MAX.

With respect to such thresholds (e.g., intra-ESS threshold and/or inter-ESS threshold, or alternatively, intra-SRG threshold and/or inter-SRG threshold), note that a threshold may be dependent on other factors such as allowable transmit power such as described with respect to FIG. 7B and FIG. 7B. As such, any of the various thresholds may vary as a function of the transmit power to be used by a wireless communication device when making a transmission or considering to make a concurrent transmission. For example, note that the thresholds (e.g., as defined for intra-ESS and inter-ESS cases) may actually be indicated in the form of reference values (e.g., transmit power lower and upper values) where the actual threshold is an offset from those reference values according to transmit power.

Various aspects of the invention solve may be viewed as including various components (e.g., three components in one implementation): (1) A mechanism by which APs and STAs are configured with, or discover, identifiers that allow them to determine transmissions by other devices (APs or STAs) in their same network (ESS); (2) A mechanism by which an AP configures associated STAs with the first intra-ESS threshold and/or first intra-SRG threshold; and (3) A procedure whereby a device (AP or STA), when performing LBT, determines whether an ongoing transmission is from a device in the same or different ESS, and applies the corresponding LBT threshold accordingly.

Component 1:

The infrastructure of a network (extended service set (ESS)) is comprised of one or more APs, where each AP is identifiable by a unique MAC address (BSSID), and sometimes also by a quasi-unique BSS Color (e.g. IEEE 802.11ax). Therefore, an ESS may be defined by a list of BSSIDs of its constituent APs/BSS (Intra-ESS BSSID List and/or Intra-SRG BSSID List) and/or a list of the BSS Color of its constituent APs/BSS (Intra-ESS BSS Color List and/or Intra-SRG BSS Color List). In some examples, note that the Intra-ESS BSSID List (and/or Intra-SRG BSSID List) may be alternatively referred to as SRG Partial BSSID Bitmap. In some examples, note that the Intra-ESS BSSID Color List (and/or Intra-SRG BSSID Color List) may be alternatively referred to as SRG BSS Color Bitmap. With respect to such a BSSID List, note that such a list may be a partial BSSID such as may include a mapping of a subset of buts as included in a full BSSID such as may be implemented for compactness. In addition, and in other examples, note that such a BSSID and/or partial BSSID may be represented in form of a bitmap.

An AP may be configured with an Intra-ESS BSSID List and/or Intra-ESS BSS Color List (or alternatively, Intra-SRG BSSID List and/or Intra-SRG BSS Color List) by a management system controlled by the network operator, such as a WLAN Controller. A STA may be configured by an AP with an Intra-ESS BSSID List and/or Intra-ESS BSS Color List (or, alternatively, Intra-SRG BSSID List and/or Intra-SRG BSS Color List), by the AP embedding this information in a frame transmitted over from the AP to the STA (e.g. in the association response, or similar).

Alternatively, an AP or STA can discover neighboring APs that are in the same ESS and/or SRG by taking one or more of the following steps:

Active or passive scanning of the current operating channel(s), and receiving Beacon and/or Probe Response frames from other APs operating on the channel(s).

For each received Beacon and/or Probe Response frame, check if the SSID indicated in the frame matches the SSID of its own BSS.

If there is a match, record the BSSID (source MAC address in MAC header) indicated in the frame, and where available the BSS Color (in PHY header), in the Intra-ESS BSSID List and Intra-ESS BSS Color List (or, alternatively, Intra-SRG BSSID List and Intra-SRG BSS Color List).

Note that configuration of an AP by a network management system may be preferable since it is more complete— an AP's ability to discover neighboring APs may be limited by RF coverage—and it may also be quicker and more power efficient. However, some networks may not have management systems with such capability, so discovery by the AP itself provides a good alternative in those cases. Similarly, configuration of a STA by its AP may be preferable if the AP has more complete information, and it may also reduce any need for the STA to perform its own scanning (which can impact power consumption, particularly in mobile devices). However, an AP may not be capable of providing such list or it may be incomplete, so discovery by the STA itself provides a good alternative in these cases.

Component 2:

An AP may be configured with a first Intra-ESS LBT Threshold (and/or first Intra-SRG LBT Threshold) by a management system controlled by the network operator, such as a WLAN Controller. An AP may configure a STA with this threshold by embedding this information in a frame sent over the air from the AP to the STA (e.g. in association response).

Component 3:

A device performing LBT can take one or more of the following steps:

First, determine if there is an ongoing transmission, and if so decode the BSSID and/or BSS Color (if available) from the MAC and PHY headers, respectively.

Determine if the ongoing transmission is from a device in the same BSS—e.g., if decoded BSSID and/or BSS Color are equal to that of the device's own BSS. If so, deem the communication medium "busy" and begin deferral process per LBT procedure.

Otherwise (e.g., if the ongoing transmission is determined to be from an OBSS), determine if the decoded BSSID and/or BSS Color match an entry in the Intra-ESS BSSID List or Intra-ESS BSS Color List (or alternatively, Intra-SRG BSSID List or Intra-SRG BSS Color List).

If so, compare the received power of the ongoing transmission with the Intra-ESS threshold (and/or Intra-SRG threshold) (e.g. as configured by the network operator). If the level is below this threshold, deem the communication medium "idle" and proceed with transmission per LBT procedure. Otherwise, deem the communication medium "busy" and being deferral process per LBT procedure.

If not, compare the received power of the ongoing transmission with the Inter-ESS threshold (and/or Inter-SRG threshold) (e.g. as globally specified). If the level is below this threshold, deem the communication medium "idle" and proceed with transmission per LBT procedure. Otherwise, deem the communication medium "busy" and begin deferral process per LBT procedure.

FIG. 5A is a diagram illustrating another example 501 of communication between wireless communication devices. In an example of operation and implementation, the WDEV 391 is configured to receive a first signal from another wireless communication device (e.g., WDEV 390). The WDEV 310 is configured to process the first signal to determine whether or not an ongoing transmission may be made concurrently as the first signal is being transmitted from the WDEV 390 to the WDEV 391. Note that this first signal is intended for another wireless communication device (e.g., WDEV 391) besides WDEV 310 (though it may be also intended for WDEV 310 in some other examples). However, the WDEV 310 receives and/or detects the first signal based on the first signal's radiation pattern (e.g., radiating into a region that is detectable by the WDEV 310).

FIG. 5B is a diagram illustrating another example 502 of communication between wireless communication devices. The WDEV 310 receives and/or detects the first signal based on the first signal's radiation pattern, and the WDEV 310 is configured to determine certain characteristic(s) of the first signal and to determine whether another transmission, a second signal, may be made from the WDEV 310 to the WDEV 311. For example, the WDEV 310 is configured to begin or commence transmission of the second signal to a second other wireless communication device (e.g., WDEV 311) during receipt and/or detection of the first signal being transmitted from the first other wireless communication device (e.g., WDEV 390) such as to the WDEV 391.

With respect to operation of FIG. 3A and FIG. 3B, the WDEV 310 is configured to begin transmission of the second signal to WDEV 311 on top of or simultaneously with the transmission of the first signal from WDEV 390 to WDEV 391. The WDEV 310 may also be configured to determine when it is permissible to begin making such transmissions. For example, there may be one or more additional considerations that govern when a concurrent transmission may be made using the one or more concurrent transmission parameters determined based on the first signal transmitted from WDEV 390.

FIG. 5C is a diagram illustrating another example 503 of communication between wireless communication devices. In an example of operation and implementation, the WDEV 392 is configured to monitor for an ongoing transmission on a wireless communication medium before transmitting a signal to WDEV 393 via the wireless communication medium. When the ongoing transmission is detected on the wireless communication medium, the WDEV 392 is configured to process the ongoing transmission to determine whether the ongoing transmission is based on a first wireless communication network that includes the WDEV 392 or based on a second wireless communication network that excludes the WDEV 392 (e.g., that includes WDEVs 310, 311, 390, and/or 392).

When the ongoing transmission is based on the first wireless communication network, the WDEV 392 is configured to transmit the signal to the WDEV 393 via the wireless communication medium when power of the ongoing transmission compares favorably to a first threshold level associated with the first wireless communication network. Alternatively, when the ongoing transmission is based on the second wireless communication network, the WDEV 392 is configured to transmit the signal to the WDEV 393 via the wireless communication medium when the power of the ongoing transmission compares favorably to a second threshold level associated with the second wireless communication network.

Note that there are some situations in which no transmission is initially made by the WDEV 392 to the WDEV 393 such as that the WDEV 392 performs a back procedure for some period of time before re-initiating the process to perform monitoring for an ongoing transmission on a wireless communication medium before transmitting a signal to WDEV 393 via the wireless communication medium.

FIG. 6A is a diagram illustrating another example 601 of communication between wireless communication devices. In an example of operation and implementation, the WDEV 392 is configured to monitor for an ongoing transmission on a wireless communication medium before transmitting a signal to WDEV 393 via the wireless communication medium. When the ongoing transmission is detected on the wireless communication medium and is based on a first wireless communication network that includes the WDEV 392, the WDEV 392 is configured to transmit the signal to the WDEV 393 via the wireless communication medium when power of the ongoing transmission compares favorably to a first threshold level associated with the first wireless communication network. Alternatively, when the ongoing transmission is detected on the wireless communication medium and is based on a first wireless communication network that includes the WDEV 392, the WDEV 392 is configured to transmit the signal to the WDEV 393 via the wireless communication medium when power of the ongoing transmission compares favorably to a first variable threshold level function associated with the first wireless communication network.

FIG. 6B is a diagram illustrating another example 602 of communication between wireless communication devices. In an example of operation and implementation, the WDEV 392 is configured to monitor for an ongoing transmission on a wireless communication medium before transmitting a signal to WDEV 393 via the wireless communication medium. When the ongoing transmission is detected on the wireless communication medium and is based on a second wireless communication network that excludes the WDEV 392, the WDEV 392 is configured to transmit the signal to the WDEV 393 via the wireless communication medium when power of the ongoing transmission compares favorably to a second threshold level associated with the second wireless communication network that is different than the first threshold level associated with the first wireless communication network. Alternatively, when the ongoing transmission is detected on the wireless communication medium and is based on a first wireless communication network that includes the WDEV 392, the WDEV 392 is configured to transmit the signal to the WDEV 393 via the wireless communication medium when power of the ongoing transmission compares favorably to a second variable threshold level function associated with the first wireless communication network that is different than the first variable threshold level function associated with the first wireless communication network.

FIG. 7A is a diagram illustrating an example 701 of multiple thresholds used to determine allowable communications between wireless communication devices. A wireless communication device is configured to use different respective power detect (PD) levels when determining whether it is allowable to make an ongoing transmission. For example, when an ongoing transmission is detected and determined to be associated with a first wireless network (e.g., that includes that wireless communication device), the wireless communication device is configured to use a wireless communication network 1 threshold. When the power associated with the ongoing transmission is detected and determined to be associated with a first wireless network and compares favorably (e.g., is below (or equal to) the wireless communication network 1 threshold), the wireless communication device is configured to effectuate a concurrent transmission.

Alternatively, when an ongoing transmission is detected and determined to be associated with a second wireless network (e.g., that excludes that wireless communication device), the wireless communication device is configured to use a wireless communication network 2 threshold. When the power associated with the ongoing transmission is detected and determined to be associated with a second wireless network and compares favorably (e.g., is below (or equal to) the wireless communication network 2 threshold), the wireless communication device is configured to effectuate a concurrent transmission.

In even other examples, a wireless communication device is configured to use different respective variable threshold level function(s) when determining whether it is allowable to make an ongoing transmission. For example, different respective variable threshold level function(s) may be used depending on whether an ongoing detected transmission is associated with a first wireless network or a second wireless network.

FIG. 7B is a diagram illustrating an example 702 of a variable threshold level function used to determine allowable communications between wireless communication devices. For example, when an ongoing transmission is detected and determined to be associated with a first wireless network (e.g., that includes that wireless communication device), the wireless communication device is configured to use a first variable threshold level function. When the power associated with the ongoing transmission is detected and determined to be associated with a first wireless network and compares favorably (e.g., is below (or equal to) the first variable threshold level function), the wireless communication device is configured to effectuate a concurrent transmission.

This first variable threshold level function specifies power detect levels that vary between a first threshold shown as a threshold 1,1 (e.g., a first clear channel assessment (CCA) maximum 1 value) and a second threshold shown as a threshold 1,2 (e.g., a second CCA minimum 1 value). Also, the first variable threshold level function varies between these two threshold levels at two inflection points between lower and upper transmit power levels (e.g., such as associated with the wireless communication device). In some examples, the lower transmit level is 3 dBm and the upper transmit level is 23 dBm, and the first threshold/threshold 1,1 is −62 dBm and the second threshold/threshold 1,2 is −82 dBm. Generally speaking, any desired values may be used for the first threshold/threshold 1,1, the second threshold/threshold 1,2, and the lower and upper transmit power levels.

FIG. 7C is a diagram illustrating another example 703 of a variable threshold level function used to determine allowable communications between wireless communication devices. For example, when an ongoing transmission is detected and determined to be associated with a second wireless network (e.g., that includes that wireless communication device), the wireless communication device is configured to use a second variable threshold level function. When the power associated with the ongoing transmission is detected and determined to be associated with a second wireless network and compares favorably (e.g., is below (or equal to) the second variable threshold level function), the wireless communication device is configured to effectuate a concurrent transmission.

This second variable threshold level function specifies power detect levels that vary between another first threshold shown as a threshold 2,1 (e.g., a first clear channel assessment (CCA) maximum 2 value) and another second threshold shown as a threshold 2,2 (e.g., a second CCA minimum 2 value). Also, this other first variable threshold level function varies between these two threshold levels at two inflection points between lower and upper transmit power levels (e.g., such as associated with the wireless communication device). Note that the lower and upper transmit power levels of FIG. 7C may be same and/or different than the lower and upper transmit power levels of FIG. 7B. Generally speaking, any desired values may be used for this other first threshold/threshold 2,1, this other second threshold/threshold 2,2, and the lower and upper transmit power levels.

As can be seen with respect to certain examples, embodiment, etc. herein, two different respective wireless communication network threshold(s) and/or different respective variable threshold level function(s). Note also that such principles as described herein may be extended to more than two respective wireless communication networks, more than two different respective wireless communication network thresholds, and/or different respective variable threshold level functions. For example, alternative implementations may operate such that 3 different respective wireless communication network thresholds and/or 3 different respective variable threshold level functions associated with 3 different respective wireless communication networks. Generally, alternative implementations may operate such that n different respective wireless communication network thresholds and/or n different respective variable threshold level functions associated with n different respective wireless communication networks such that n is a positive integer greater than or equal to 2.

Figure 8:
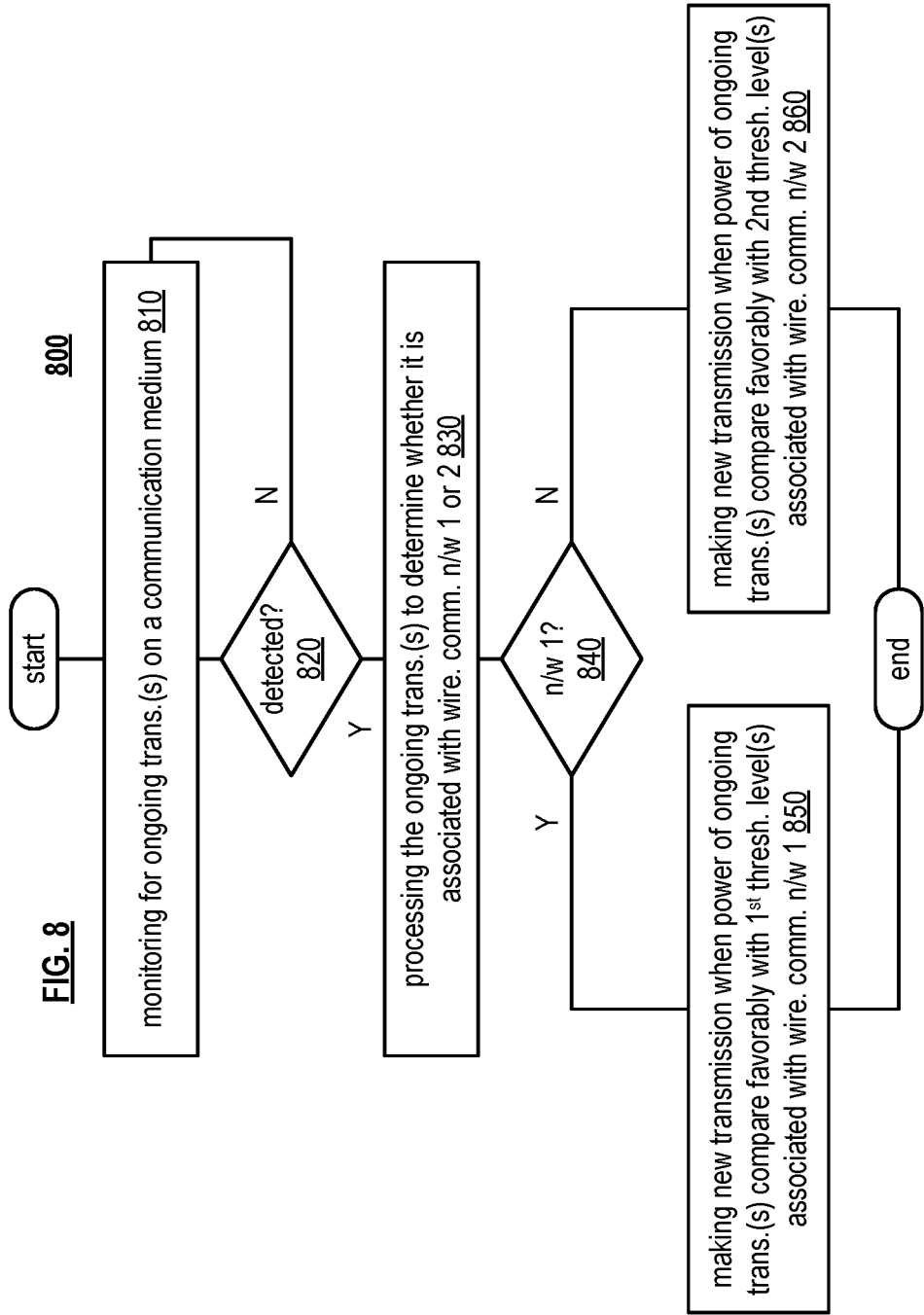
FIG. 8 is a diagram illustrating an embodiment of a method for execution by one or more wireless communication devices.

FIG. 8 is a diagram illustrating an embodiment of a method 800 for execution by one or more wireless communication devices. The method 800 begins by monitoring for an ongoing transmission on a wireless communication medium before transmitting a signal to another wireless communication device via the wireless communication medium (block 810).

The method 800 continues by determine whether an ongoing transmission is detected or not, and branches to block 830 when an ongoing transmission is detected or alternatively loops back to block 810 when no ongoing transmission is detected (block 820).

When the ongoing transmission is based on the first wireless communication network (as determined in block 840), the method 800 then operates by transmitting (e.g., via a communication interface of the wireless communication device) the signal to the another wireless communication device via the wireless communication medium when power of the ongoing transmission compares favorably to a first threshold level associated with the first wireless communication network (block 850).

Alternatively, when the ongoing transmission is based on the second wireless communication network (as determined in block 840), the method 800 continues by transmitting (e.g., via the communication interface of the wireless communication device) the signal to the another wireless communication device via the wireless communication medium when the power of the ongoing transmission compares favorably to a second threshold level associated with the second wireless communication network (block 860).

It is noted that the various operations and functions described within various methods herein may be performed within a wireless communication device (e.g., such as by the processing circuitry 330, communication interface 320, and memory 340 and/or processing circuitry 330*a* and/or processing circuitry 330*b* such as described with reference to FIG. 2B) and/or other components therein. Generally, a communication interface and processing circuitry (or alternatively a processing circuitry that includes communication interface functionality, components, circuitry, etc.) in a wireless communication device can perform such operations.

Examples of some components may include one or more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennas. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
monitor for an ongoing transmission on a wireless communication medium before transmitting a signal to another wireless communication device via the wireless communication medium;
when the ongoing transmission is detected on the wireless communication medium, process the ongoing transmission to determine whether the ongoing transmission is based on a first wireless communication network that includes the wireless communication device or based on a second wireless communication network that excludes the wireless communication device;
when the ongoing transmission is based on the first wireless communication network, transmit the signal to the another wireless communication device via the wireless communication medium to be processed by the another wireless communication device when power of the ongoing transmission compares favorably to a first threshold level associated with the first wireless communication network; and
when the ongoing transmission is based on the second wireless communication network, transmit the signal to the another wireless communication device via the wireless communication medium to be processed by the another wireless communication device when the power of the ongoing transmission compares favorably to a second threshold level associated with the second wireless communication network.

2. The wireless communication device of claim 1, wherein the at least one of the communication interface or the processing circuitry is further configured to:
when the ongoing transmission is based on the first wireless communication network, re-monitor for at least one of the ongoing transmission or another ongoing transmission on the wireless communication medium when the power of the ongoing transmission compares unfavorably to the first threshold level associated with the first wireless communication network; and
when the ongoing transmission is based on the second wireless communication network, re-monitor for the at least one of the ongoing transmission or the another ongoing transmission on the wireless communication medium when the power of the ongoing transmission compares unfavorably to the second threshold level associated with the second wireless communication network.

3. The wireless communication device of claim 1, wherein the at least one of the communication interface or the processing circuitry is further configured to:
process the ongoing transmission in accordance with a first clear channel assessment (CCA) procedure that employs the first threshold level when the ongoing transmission is based on the first wireless communication network; and process the ongoing transmission in accordance with a second CCA procedure that employs the second threshold level when the ongoing transmission is based on the second wireless communication network.

4. The wireless communication device of claim 1, wherein the at least one of the communication interface or the processing circuitry is further configured to:

receive, from a controller wireless communication device of at least one of the first wireless communication network or the second wireless communication network, information that specifies:
- a first set of basic services sets (BSSs) supported by a first plurality of other wireless communication devices that correspond to the first wireless communication network that includes the wireless communication device; and
- a second set of BSSs supported by a second plurality of other wireless communication devices that correspond to the second wireless communication network that excludes the wireless communication device;

process the ongoing transmission to determine at least one of a source wireless communication device or a destination wireless communication device of the ongoing transmission;

determine that the ongoing transmission is based on the first wireless communication network that includes the wireless communication device when the at least one of the source wireless communication device or the destination wireless communication device is included in the first set of BSSs; and determine that the ongoing transmission is based on the second wireless communication network that excludes the wireless communication device when the at least one of the source wireless communication device or the destination wireless communication device is included in the second set of BSSs.

5. The wireless communication device of claim 1, wherein the at least one of the communication interface or the processing circuitry is further configured to:

when the ongoing transmission is based on the first wireless communication network, select the first threshold level associated with the first wireless communication network based on a first variable threshold level function that is based on a first transmit power to be used by the wireless communication device to transmit the signal; and when the ongoing transmission is based on the second wireless communication network, select the second threshold level associated with the second wireless communication network based on a second variable threshold level function that is based on a second transmit power to be used by the wireless communication device to transmit the signal.

6. The wireless communication device of claim 1, wherein:

the first wireless communication network that includes the wireless communication device includes a first set of jointly managed basic services sets (BSSs) supported by a first plurality of access points (APs) that service a first at least one wireless station (STA);

the second wireless communication network that excludes the wireless communication device includes a second set of jointly managed BSSs supported by a second plurality of APs that service a second at least one STA; and the first wireless communication network and the second wireless communication network include at least some overlapping coverage.

7. The wireless communication device of claim 1 further comprising:

the communication interface configured to support communications within at least one of a satellite communication system, a wireless communication system, a wired communication system, a fiber-optic communication system, or a mobile communication system; and the processing circuitry configured to:
- detect the ongoing transmission based on at least one signal received via the communication interface; and
- transmit the signal to the another wireless communication device via the communication interface and via the wireless communication medium.

8. The wireless communication device of claim 1 further comprising:

a wireless station (STA), wherein the another wireless communication device includes an access point (AP) that supports a basic services set (BSS) within the first wireless communication network that includes the wireless communication device.

9. A wireless communication device comprising:

a communication interface; and processing circuitry that is coupled to the communication interface, wherein at least one of the communication interface or the processing circuitry configured to:

monitor for an ongoing transmission on a wireless communication medium before transmitting a signal to another wireless communication device via the wireless communication medium;

when the ongoing transmission is detected on the wireless communication medium, process the ongoing transmission to determine whether the ongoing transmission is based on a first wireless communication network that includes the wireless communication device or based on a second wireless communication network that excludes the wireless communication device;

when the ongoing transmission is based on the first wireless communication network:
- select a first threshold level associated with the first wireless communication network based on a first variable threshold level function that varies between a first maximum threshold level and a first minimum threshold level and that is based on a first transmit power to be used by the wireless communication device to transmit the signal; and
- transmit the signal to the another wireless communication device via the wireless communication medium to be processed by the another wireless communication device when power of the ongoing transmission compares favorably to the first threshold level associated with the first wireless communication network; and when the ongoing transmission is based on the second wireless communication network:
- select a second threshold level associated with the second wireless communication network based on a second variable threshold level function that varies between a second maximum threshold level and a second minimum threshold level and that is based on a second transmit power to be used by the wireless communication device to transmit the signal; and transmit the signal to the another wireless communication device via the wireless communication medium to be processed by the another wireless communication device when the power of the ongoing transmission compares favorably to the second threshold level associated with the second wireless communication network.

10. The wireless communication device of claim 9, wherein the at least one of the communication interface or the processing circuitry is further configured to:

when the ongoing transmission is based on the first wireless communication network, re-monitor for at least one of the ongoing transmission or another ongoing transmission on the wireless communication medium when the power of the ongoing transmission compares unfavorably to the first threshold level associated with the first wireless communication network; and when the ongoing transmission is based on the second wireless communication network, re-monitor for the at least one of the ongoing transmission or the another ongoing transmission on the wireless communication medium when the power of the ongoing transmission compares unfavorably to the second threshold level associated with the second wireless communication network.

11. The wireless communication device of claim 9, wherein the at least one of the communication interface or the processing circuitry is further configured to:

process the ongoing transmission in accordance with a first clear channel assessment (CCA) procedure that employs the first threshold level when the ongoing transmission is based on the first wireless communication network; and process the ongoing transmission in accordance with a second CCA procedure that employs the second threshold level when the ongoing transmission is based on the second wireless communication network.

12. The wireless communication device of claim 9, wherein the at least one of the communication interface or the processing circuitry is further configured to:

receive, from a controller wireless communication device of at least one of the first wireless communication network or the second wireless communication network, information that specifies:

a first set of basic services sets (BSSs) supported by a first plurality of other wireless communication devices that correspond to the first wireless communication network that includes the wireless communication device; and a second set of BSSs supported by a second plurality of other wireless communication devices that correspond to the second wireless communication network that excludes the wireless communication device;

process the ongoing transmission to determine at least one of a source wireless communication device or a destination wireless communication device of the ongoing transmission;

determine that the ongoing transmission is based on the first wireless communication network that includes the wireless communication device when the at least one of the source wireless communication device or the destination wireless communication device is included in the first set of BSSs; and determine that the ongoing transmission is based on the second wireless communication network that excludes the wireless communication device when the at least one of the source wireless communication device or the destination wireless communication device is included in the second set of BSSs.

13. The wireless communication device of claim 9 further comprising:

a wireless station (STA), wherein the another wireless communication device includes an access point (AP) that supports a basic services set (BSS) within the first wireless communication network that includes the wireless communication device.

14. A method for execution by a wireless communication device, the method comprising:

monitoring for an ongoing transmission on a wireless communication medium before transmitting a signal to another wireless communication device via the wireless communication medium;

when the ongoing transmission is detected on the wireless communication medium, processing the ongoing transmission to determine whether the ongoing transmission is based on a first wireless communication network that includes the wireless communication device or based on a second wireless communication network that excludes the wireless communication device;

when the ongoing transmission is based on the first wireless communication network, transmitting, via a communication interface of the wireless communication device, the signal to the another wireless communication device via the wireless communication medium to be processed by the another wireless communication device when power of the ongoing transmission compares favorably to a first threshold level associated with the first wireless communication network; and when the ongoing transmission is based on the second wireless communication network, transmitting, via the communication interface of the wireless communication device, the signal to the another wireless communication device via the wireless communication medium to be processed by the another wireless communication device when the power of the ongoing transmission compares favorably to a second threshold level associated with the second wireless communication network.

15. The method of claim 14 further comprising:

when the ongoing transmission is based on the first wireless communication network, re-monitoring for at least one of the ongoing transmission or another ongoing transmission on the wireless communication medium when the power of the ongoing transmission compares unfavorably to the first threshold level associated with the first wireless communication network; and when the ongoing transmission is based on the second wireless communication network, re-monitoring for the at least one of the ongoing transmission or the another ongoing transmission on the wireless communication medium when the power of the ongoing transmission compares unfavorably to the second threshold level associated with the second wireless communication network.

16. The method of claim 14 further comprising:
processing the ongoing transmission in accordance with a first clear channel assessment (CCA) procedure that employs the first threshold level when the ongoing transmission is based on the first wireless communication network; and
processing the ongoing transmission in accordance with a second CCA procedure that employs the second threshold level when the ongoing transmission is based on the second wireless communication network.

17. The method of claim 14 further comprising:
receiving, via the communication interface and from a controller wireless communication device of at least one of the first wireless communication network or the second wireless communication network, information that specifies:
  a first set of basic services sets (BSSs) supported by a first plurality of other wireless communication devices that correspond to the first wireless communication network that includes the wireless communication device; and
  a second set of BSSs supported by a second plurality of other wireless communication devices that correspond to the second wireless communication network that excludes the wireless communication device;
processing the ongoing transmission to determine at least one of a source wireless communication device or a destination wireless communication device of the ongoing transmission;
determining that the ongoing transmission is based on the first wireless communication network that includes the wireless communication device when the at least one of the source wireless communication device or the destination wireless communication device is included in the first set of BSSs; and
determining that the ongoing transmission is based on the second wireless communication network that excludes the wireless communication device when the at least one of the source wireless communication device or the destination wireless communication device is included in the second set of BSSs.

18. The method of claim 14, wherein:
when the ongoing transmission is based on the first wireless communication network, selecting the first threshold level associated with the first wireless communication network based on a first variable threshold level function that is based on a first transmit power to be used by the wireless communication device to transmit the signal; and
when the ongoing transmission is based on the second wireless communication network, selecting the second threshold level associated with the second wireless communication network based on a second variable threshold level function that is based on a second transmit power to be used by the wireless communication device to transmit the signal.

19. The method of claim 14, wherein:
the first wireless communication network that includes the wireless communication device includes a first set of jointly managed basic services sets (BSSs) supported by a first plurality of access points (APs) that service a first at least one wireless station (STA);
the second wireless communication network that excludes the wireless communication device includes a second set of jointly managed BSSs supported by a second plurality of APs that service a second at least one STA; and
the first wireless communication network and the second wireless communication network include at least some overlapping coverage.

20. The method of claim 14, wherein the wireless communication device includes a wireless station (STA), and the another wireless communication device includes an access point (AP) that supports a basic services set (BSS) within the first wireless communication network that includes the wireless communication device.

* * * * *